(12) United States Patent
Pujari et al.

(10) Patent No.: US 9,892,383 B2
(45) Date of Patent: Feb. 13, 2018

(54) TRANSACTIONAL SERVICES PLATFORM

(75) Inventors: Sushant K. Pujari, Yorktown Heights, NY (US); Lloyd S. Palmer, Jr., Hilliard, OH (US); Brian P. Theado, Canal Winchester, OH (US); Khoa N. Nguyen, Westerville, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 821 days.

(21) Appl. No.: 13/332,434

(22) Filed: Dec. 21, 2011

(65) Prior Publication Data

US 2013/0166446 A1    Jun. 27, 2013

(51) Int. Cl.
*G06Q 20/02* (2012.01)
*G06Q 20/08* (2012.01)
(52) U.S. Cl.
CPC ........... *G06Q 20/027* (2013.01); *G06Q 20/08* (2013.01)
(58) Field of Classification Search
CPC .................................................. G06Q 20/027
USPC ......................................................... 705/75
See application file for complete search history.

(56) References Cited

U.S. PATENT DOCUMENTS

| 2002/0078209 | A1* | 6/2002 | Peng | H04L 29/06 709/227 |
| 2008/0048025 | A1* | 2/2008 | Fitzgerald | G06Q 20/10 235/380 |
| 2008/0049753 | A1* | 2/2008 | Heinze | H04L 12/5695 370/392 |
| 2011/0057025 | A1* | 3/2011 | Denzer | G06Q 20/20 235/375 |

* cited by examiner

*Primary Examiner* — Chinedu C Agwumezie

(57) ABSTRACT

One or more devices within a transaction services hub receive, via an internal distribution network interface, configuration settings for a network connection between merchant devices and a host device and establish, based on the configuration settings, a virtual private network (VPN) session between the one or more devices within the transaction services hub and the host device. The one or more devices receive, from a first merchant device, a first transaction authorization request originating via a voice network and receive, from second merchant transaction device, a second transaction authorization request originating via an Internet Protocol network. The one or more devices route, via the VPN session, the first and the second transaction authorization requests to the host device, collect data regarding the first and the second transaction authorization requests, and provide, via a public network connection, an interface to retrieve reports based on the collected data.

18 Claims, 10 Drawing Sheets

TRANSACTIONAL SERVICES PLATFORM

BACKGROUND

Transaction services may generally include data communications over a network to support a secure transaction. Transaction services may be characterized by short sessions to support inquiry-and-response applications. Transaction applications may include, for example, credit/debit card authorization, automated teller machine (ATM) activity, insurance verification, and home health monitoring.

DETAILED DESCRIPTION OF PREFERRED EMBODIMENTS

The following detailed description refers to the accompanying drawings. The same reference numbers in different drawings may identify the same or similar elements.

Transaction services may be provided to entities that need a network solution for short (e.g., typically 15 seconds or less) connections for their customers to reach their hosts. A majority of traffic in transaction services can arise from credit or debit card transactions; but other types of traffic may also utilize these services, including insurance verification, home health monitoring, processing of fishing and hunting licenses, etc. Transaction services customers are typically referred to as "processors" or "hosts" that act as middle men between, for example, merchants on one end and banks or card marketing organizations (e.g., Visa®, Mastercard®, etc.) on the other end.

Systems and/or methods described herein may include one or more devices within a transaction services hub to receive, via an internal distribution network interface, configuration settings for a network connection between merchant devices and a host device. The systems and/or methods may establish, based on the configuration settings, a virtual private network (VPN) session between the one or more devices within the transaction services hub and the host device. The one or more devices may receive, from a first merchant device, a first transaction authorization request originating via a voice network and may receive, from second merchant transaction device, a second transaction authorization request originating via an Internet protocol network. The one or more devices may route, via the VPN session, the first and the second transaction authorization requests to the host device, collect data regarding the first and the second transaction authorization requests, and provide, via a public network connection, an interface to retrieve reports based on the collected data.

Figure 1:
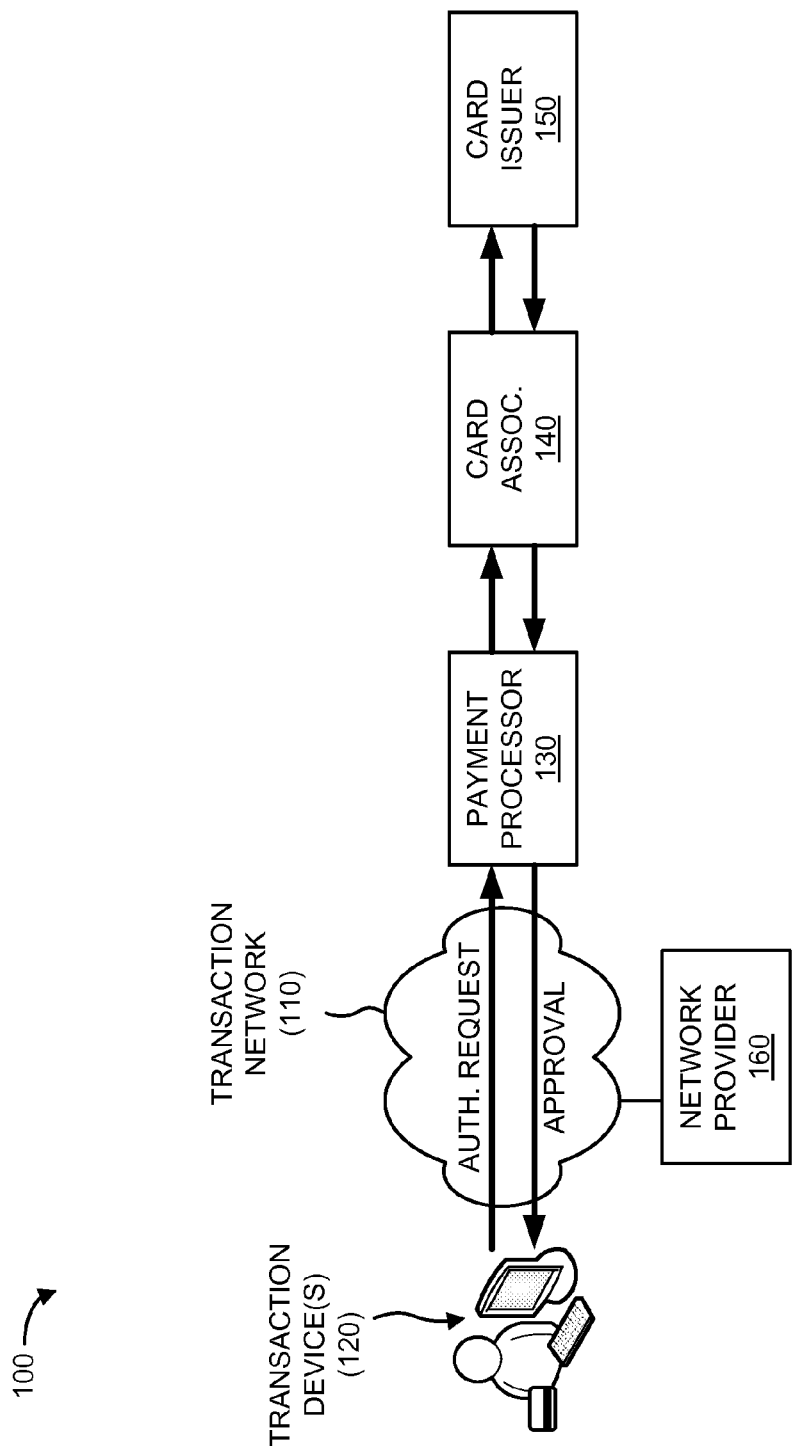
FIG. 1 is a diagram that illustrates an exemplary network in which systems and/or methods, described herein, may be implemented.

FIG. 1 is a diagram that illustrates an exemplary network 100 in which systems and/or methods described herein may be implemented. As shown in FIG. 1, network 100 may include a transaction network 110, a transaction device 120, a payment processor 130, a card association 140, a card issuer 150, and a network provider 160. Devices and/or networks of FIG. 1 may be connected via wired and/or wireless connections.

Transaction network 110 may include a network to facilitate data communications, such as credit card authorizations, between transaction device 120 and payment processor 130. Particularly, transaction network 110 may facilitate transactions characterized by short sessions, low bandwidth requirements, and quick call set-ups, for inquiry-response applications. Transaction network 110 may generally include one or more wired, wireless, and/or optical networks that are capable of receiving and transmitting data, voice and/or video signals. For example, transaction network 110 may include one or more public switched telephone networks (PSTNs) or another type of switched network. Transaction network 110 may also include one or more wireless networks and may include a number of transmission towers for receiving wireless signals and forwarding the wireless signals toward the intended destination. Transaction network 110 may further include one or more satellite networks, one or more packet switched networks, such as an Internet protocol (IP) based network, a local area network (LAN), a wide area network (WAN), a personal area network (PAN), a WiFi network, a Bluetooth network, an intranet, the Internet, or another type of network that is capable of transmitting data. In some implementations, transaction network 110 may include a private network controlled by, for example, a telecommunications company (e.g., network provider 160) that provides telephone and/or data access to transaction device 120. In another implementation, transaction network 110 may include a public network, such as the Internet, or a combination of public and private networks. Transaction network 110 is described further in connection with, for example, FIGS. 2 and 3.

Transaction device(s) 120 may include one or more computing devices and/or servers that participate in a transaction, such as a purchase of goods or services from a merchant or other entity associated with transaction device 120. For example, transaction device 120 may include an electronic cash register or point-of-sale system at a retail location or another device/system that is able to receive payment information and/or other information from a user and/or a payment card (e.g., credit card, identity card, etc.). Additionally, or alternatively, transaction device may include a personal computer, a laptop computer, a tablet or "pad" computer, a personal communications system (PCS) terminal (e.g., that may combine a cellular radiotelephone with data processing and data communications capabilities), a personal digital assistant (PDA, e.g., that can include a radiotelephone, a pager, Internet/intranet access, etc.), a smartphone, or other types of computation and/or communication devices. In one implementation, transaction device 120 may include any device (e.g., an IP-based device) that enables a user to access the Internet and/or communicate with other devices. In one implementation, transaction device 120 may communicate with payment processor 130 via transaction network 110 when a transaction (e.g., a credit card purchase, point-of-sale transaction, etc.) is taking place.

Payment processor 130 may include one or more server devices, or other types of computation or communication devices, that gather, process, search, and/or provide information in a manner described herein. Payment processor 130 (also referred to as a "host") may route an authorization request from transaction device 120 to a particular card association 140. Payment processor 130 may be included, for example, within a customer's private network. In one implementation, payment processor 130 may receive, via transaction network 110, an inquiry (e.g., an authorization request) from transaction device 120 and provide a response (e.g., an approve/decline decision from card issuer 150) to transaction device 120 to facilitate a data transaction.

Card association 140 may include one or more server devices, or other types of computation or communication devices. Card association 140 may include, for example, an entity formed to administer and promote credit and cards (e.g., Visa, Master Card, etc.).

Card issuer 150 may include one or more server devices, or other types of computation or communication devices. Card issuer 150 may include, for example, a bank or other institution that authorizes a transaction (e.g., verifies that sufficient funds are associated with a credit card, verifies access rights, etc.). In one implementation, card issuer 150 may receive an authorization request that originates from transaction device 120 and provide a response and/or authorization code to approve a transaction.

Network provider 160 may include an entity that provides and manages all or a portion of transaction network 110. Network provider 160 may receive fees (e.g., a per-transaction fee, flat fee, etc.) for providing transaction services via transaction network 110.

According to an implementation described herein, a merchant may utilize transaction device 120 to initiate transaction services (e.g., a credit card authorization request), via transaction network 110, originating using either a dial (e.g., voice network) or non-dial (e.g., Internet) connection. Regardless of the originating connection from transaction device 120, transaction network 110 may provide a single interface to payment processor 130. As described further herein, transaction network 110 may provide secure connections with management and reporting tools for customers (e.g., payment processor 130) of transaction network 110.

The exemplary configuration illustrated in FIG. 1 is provided for simplicity. It should be understood that a typical network may include more or fewer devices than illustrated in FIG. 1. For example, network 100, may include thousands of transaction devices 120 via which transactions may be made. In addition, network 100 may include additional elements, such as switches, gateways, routers, etc., that aid in routing data. Also, various functions are described below as being performed by particular components in network 100. In other implementations, various functions described as being performed by one device may be performed by another device or multiple other devices, and/or various functions described as being performed by multiple devices may be combined and performed by a single device.

Figure 2:
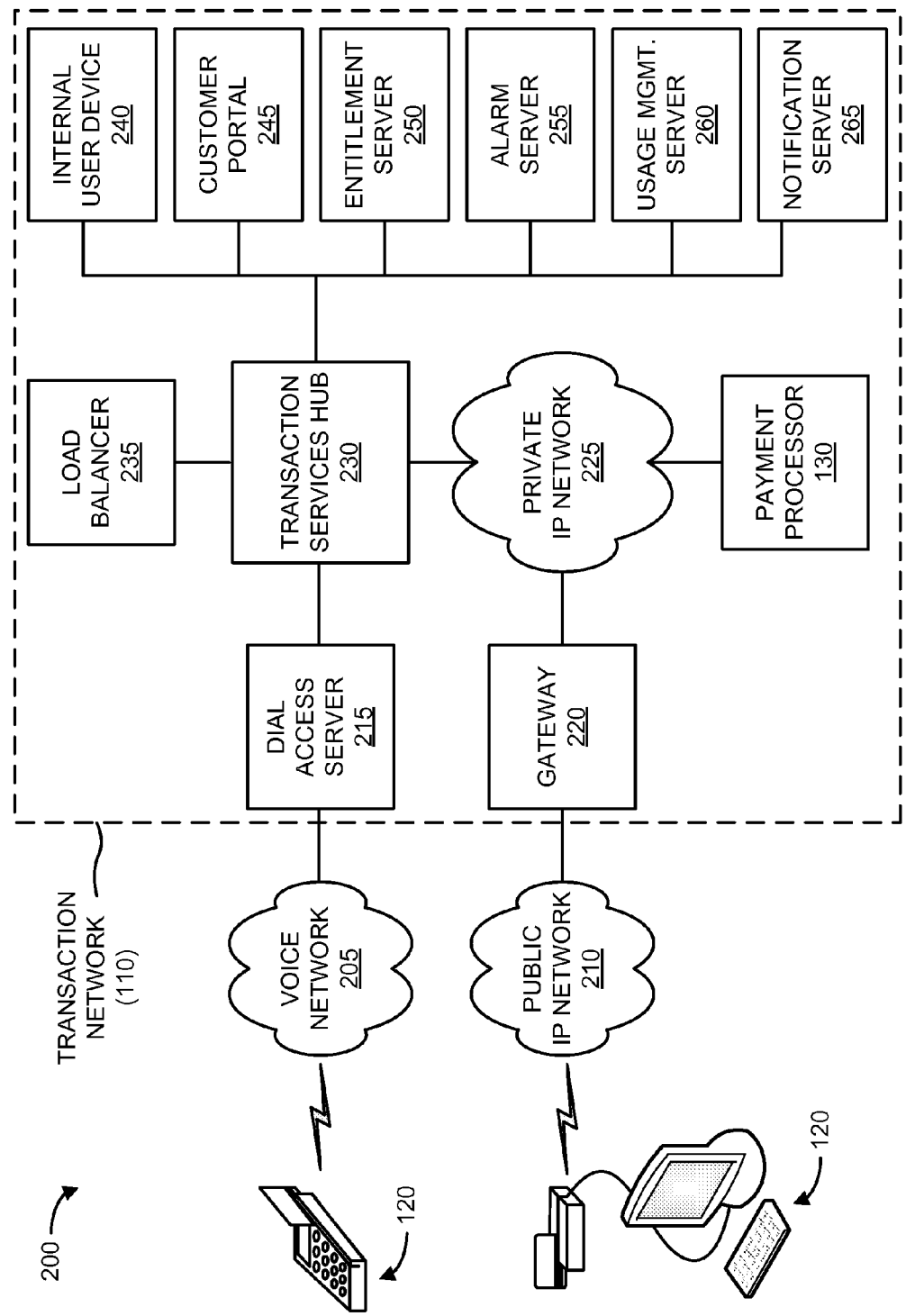
FIG. 2 is a diagram that illustrates additional details of a portion of the network of FIG. 1.

FIG. 2 provides a diagram of a portion 200 of network 100. As shown in FIG. 2, network portion 200 may include transaction devices 120, payment processor 130, a voice network 205, a public IP network 210, a dial access server 215, a gateway 220, a private IP network 225, a transaction services hub 230, a load balancer 235, an internal user device 240, a customer portal 245, an entitlement server 250, an alarm server 255, a usage management server 260, and a notification server 265. Transaction devices 120 and payment processor 130 may include features described above in connection with FIG. 1.

Voice network 205 may include components that facilitate transfer of voice traffic and/or data traffic. For example, voice network 205 may include a PSTN, a domestic toll-free voice network, and/or an international toll-free voice network.

Public IP network 210 may include a wide area network, an intranet, or a combination of networks that support IP communications. Public IP network 210 may include, for example, an untrusted network, such as the Internet. Public IP network 210 may further include transport and/or network devices such as routers, switches, and/or firewalls.

Dial access server 215 may include one or more server devices, or other types of computation or communication devices. In one implementation, dial access server 215 may receive circuit-based signals and demodulate voice-band data of the circuit-based signals. The dial access server 215 may then extract IP packets for routing (e.g., via a TCP connection) to the appropriate destination, such as transaction services hub 230.

Gateway 220 may include one or more data transfer devices (or network devices), such as a gateway, a router, a switch, a firewall, a network interface card (NIC), a hub, a bridge, a proxy server, an optical add-drop multiplexer (OADM), or some other type of device that provides an interface between different network types. In one implementation, gateway 220 may include a hyper-text transfer protocol (HTTP) gateway or a secure socket layer (SSL) gateway to act as intermediary between public IP network 210 and private IP network 225.

Private IP network 225 may include devices and/or systems for providing services, such as a service for data transfers, voicemail, call blocking, calling card, audio, and/or network conferencing, etc. In some implementations, private IP network 225 may provide redundancy and/or the ability to distribute network loads. For example, private IP network 225 may include an IP network or a multiprotocol label switching (MPLS) network implementing an Interior Gateway Protocol (IGP) or another protocol that implements a minimum cost end-to-end path for routing between nodes. Private IP network 225 may provide one or more interface options to payment processor 130 (e.g., residing on a local customer network).

Transaction services hub 230 may include one or more server devices, or other types of computation or communication devices. Transaction services hub 230 may manage transactions from transaction device 120 via voice network 205 and/or from transaction device 120 via public IP network 210 (via gateway 220 and private IP network 225). Transaction services hub 230 may establish/maintain connectivity (e.g., secure TCP/IP sessions) with multiple payment processors 130, may route particular transaction authorization requests from a transaction device 120 to the appropriate payment processor, and may return responses (e.g., from payment processor 130) to the originating transaction device 120. For example, transaction services hub 230 may maintain a persistent socket connection (e.g., multiplexing user sessions over a single TCP session) to payment processor 130, non-persistent socket connections; multiple interfaces to multiple payment processors (e.g., with load balancing and/or failover services), support proprietary host protocols, TCP/IP interfaces, X.25 interfaces, etc. Transaction services hub 230 may also collect data regarding the transactions and provide an interface to retrieve reports based on the collected data. Transaction services hub 230 is described further below in connection with, for example, FIGS. 3-9.

Load balancer 235 may include one or more server devices, or other types of computation or communication devices. Load balancer 235 may receive transaction services requests and load balance the requests over devices in transaction services hub. For example, load balancer 235 may forward a received transaction services request to a device within transaction services hub 230 based on available resources (e., processing time), geography, etc. For example, in one implementation, transaction services hub may include multiple redundant components with geographic diversity to enable seamless failover if a particular connection between payment processor 130 and transaction services hub 230 fails.

Generally, user device 240, customer portal 245, entitlement server 250, alarm server 255, usage management server 260, and notification server 265 may provide various interfaces to transaction services hub 230. In one implementation, each of user devices 240, customer portal 245, entitlement server 250, alarm server 255, usage management server 260, and notification server 265 may be integrated with other systems/services provided by network provider 160. For example, one or more of user device 240, customer portal 245, entitlement server 250, alarm server 255, usage management server 260, and notification server 265 may provide access to information from multiple services (e.g., wireless services, Internet services, telephone services, etc.) besides transaction services.

User device 240 may include one or more computing devices, servers, or other types of computation or communication devices, that provide secure internal access to transaction services hub 230. User device 240 may, for example, allow users (e.g., a network administrator) to communicate with components of transaction services hub 230 via private secure connections. Users may use user device 240 to submit configuration settings, service level agreement (SLA) information, provisioning, etc. related to a particular payment processor 130.

Customer portal 245 may include one or more network devices, or other types of computation or communication devices, that provide limited external access to transaction services hub 230. For example, customer portal 245 may enable an authorized customer to access reporting data, residing in transaction services hub 230, that relates to a particular host (e.g., payment processor 130).

Entitlement server 250 may include one or more network devices, or other types of computation or communication devices that controls what users (or user accounts) are permitted to access particular services. For example, entitlement server 250 may provide to transaction services hub 230 a file or list of user accounts that are authorized to access particular components of transaction services hub 230 (e.g., via internal web site server 240 or customer portal 245). In one implementation, entitlement server 250 may receive lists of authorized internal and/or external users from another device, such as a device associated with a subscription/account system.

Alarm server 255 may include one or more network devices, or other types of computation or communication devices that track and disperse alarm information relating to transaction services hub 230. For example, if transaction services hub 230 identifies a problem (e.g., a failed link with a payment processor 130), transaction services hub 230 may signal alarm server 255 to generate alarms to appropriate monitoring systems and/or ticketing systems. In one implementation, alarm server 255 may also consolidate and/or correlate alarms from multiple services (e.g., wireless services, Internet services, and/or transaction services).

Usage management server 260 may include one or more network devices, or other types of computation or communication devices that track system usage by customers. For example, usage management server 260 may collect transaction statistics from transaction services hub 230 to generate customer invoices.

Notification server 265 may include one or more network devices, or other types of computation or communication devices that generate notifications (e.g., email, text messages, etc.) for customers and/or internal users. For example, notification server 265 may receive indications of service interruptions (e.g., scheduled maintenance, outages, etc.) and automatically send notifications to particular customer accounts.

Although FIG. 2 shows exemplary components of network portion 200, in other implementations, network portion 200 may include fewer, different, differently-arranged, or additional components than depicted in FIG. 2. Alternatively, or additionally, one or more components of network portion 200 may perform one or more other tasks described as being performed by one or more other components of network portion 200.

Figure 3:
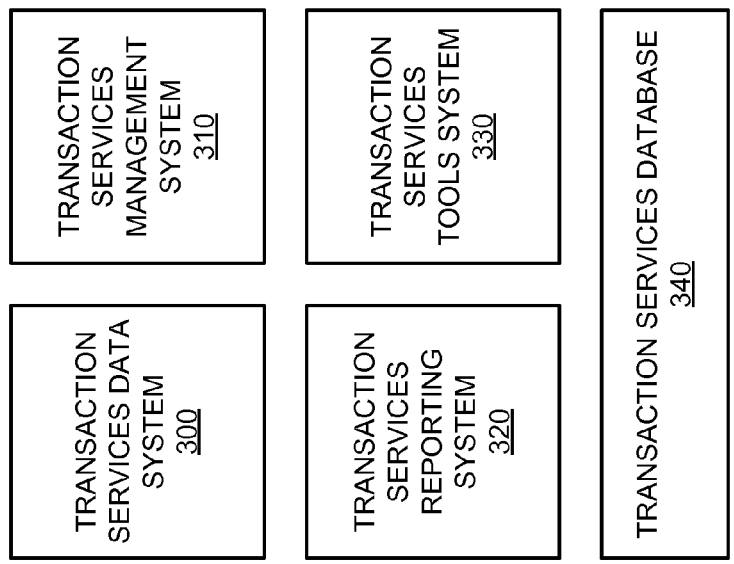
FIG. 3 is a diagram that illustrates components of a transaction services hub of FIG. 2.

FIG. 3 is a diagram that illustrates components of transaction services hub 230. As shown in FIG. 3, transaction services hub 230 may include a transaction services data system 300, a transaction services management system 310, a transaction services reporting system 320, a transaction services tools system 330, and a transaction services database 340.

Transaction services data system 300 may include one or more network devices, or other types of computation or communication devices. Transaction services data system 300 may generally be the primary component of transaction services hub 230 for processing customer transactions. Transaction services data system 300 may manage and/or monitor customer traffic (e.g., traffic relating to transaction services). Transaction services data system 300 may communicate directly or indirectly with other components of transaction services hub 230 (e.g., transaction services management system 310, transaction services reporting system 320, etc.) to receive configuration settings and provide transaction statistics. Transaction services data system 300 may also monitor the health status of customer hosts (e.g., each payment processor 130) and gather data related to each processed transaction.

In one implementation, transaction services data system 300 may include instances of a transaction gateway application for each customer (e.g., one or more instances for each payment processor 130). The transaction gateway application may be the primary driver for processing customer connections. For example, transaction services data system 300 may receive an authorization request from transaction device 120 to initiate a transaction, may route the authorization request to an appropriate payment processor 130, and may return a response (e.g., approve/reject) from payment processor 130 to transaction device 120. The transaction gateway application may also apply/strip headers for packets, identify frame start/stops, and route communications based on active monitoring/capacities. In one implementation, transaction services data system 300 may be included as a blade system within a blade hardware system. Transaction services data system 300 may also be configured as a fully redundant system with no single point of failure. Transaction services data system 300 is described further in connection with FIG. 5.

Transaction services management system 310 may include one or more network devices, or other types of computation or communication devices. In one implementation, transaction services management system 310 may provide an internal portal (e.g., a Web-based system for internal users of network provider 160) for service delivery, operations, and marketing related to transaction services provided by transaction services hub 230. For example, transaction services management system 310 may provide for customer provisioning, configuration management, reporting, troubleshooting, and/or SLA management and publishing. Transaction services management system 310 is described further in connection with FIG. 6.

Transaction services reporting system 320 may include one or more network devices, or other types of computation or communication devices. In one implementation, transaction services reporting system 320 provides a customer portal (e.g., a Web-based system for external users of network provider 160) that may be accessed via a common web-based interface, such as an enterprise center portal. In one implementation, the customer portal may provide customers with access to other services besides transaction services. Transaction services reporting system 320 may provide a variety of reporting formats/data and may give customers the ability to manage traffic. Transaction services reporting system 320 is described further in connection with FIG. 7.

Transaction services tools system 330 may include one or more network devices, or other types of computation or communication devices. Transaction services tools system 330 may include collector applications and tools applications. The collector applications generally may receive and format data for storage. The tool applications generally may provide a variety of applications to manipulate, process, and/or control reporting of stored data. In one implementation, transaction services tools system 330 may provide interfaces to billing, provisioning, monitoring, customer notification, and enterprise support systems. Transaction services tools system 330 may also include various tools to manage and maintain the other components. In one implementation, transaction services tools system 330 may also communicate with a backend database (e.g., transaction services database 340) to format and store statistics of processed transactions. Transaction services tools system 330 is described further in connection with FIG. 8.

Transaction services database 340 may store transaction information collected and/or generated by one or more of transaction services data system 300, transaction services management system 310, transaction services reporting system 320, and transaction services tools system 330. In one implementation, transaction services database 340 may include stored procedures (e.g., subprograms, such as Oracle® Stored Procedures, etc.) to manipulate data. For example, access to transaction services database 340 from a website (e.g., via customer portal 245) may be completed using calls to stored procedures to prevent common security breaches, such as SQL injection, etc. Transaction services database 340 is described further in connection with FIG. 9.

Although FIG. 3 shows exemplary components of transaction services hub 230, in other implementations, transaction services hub 230 may include fewer, different, differently-arranged, or additional components than depicted in FIG. 3. Alternatively, or additionally, one or more components of transaction services hub 230 may perform one or more other tasks described as being performed by one or more other components of transaction services hub 230.

Figure 4:
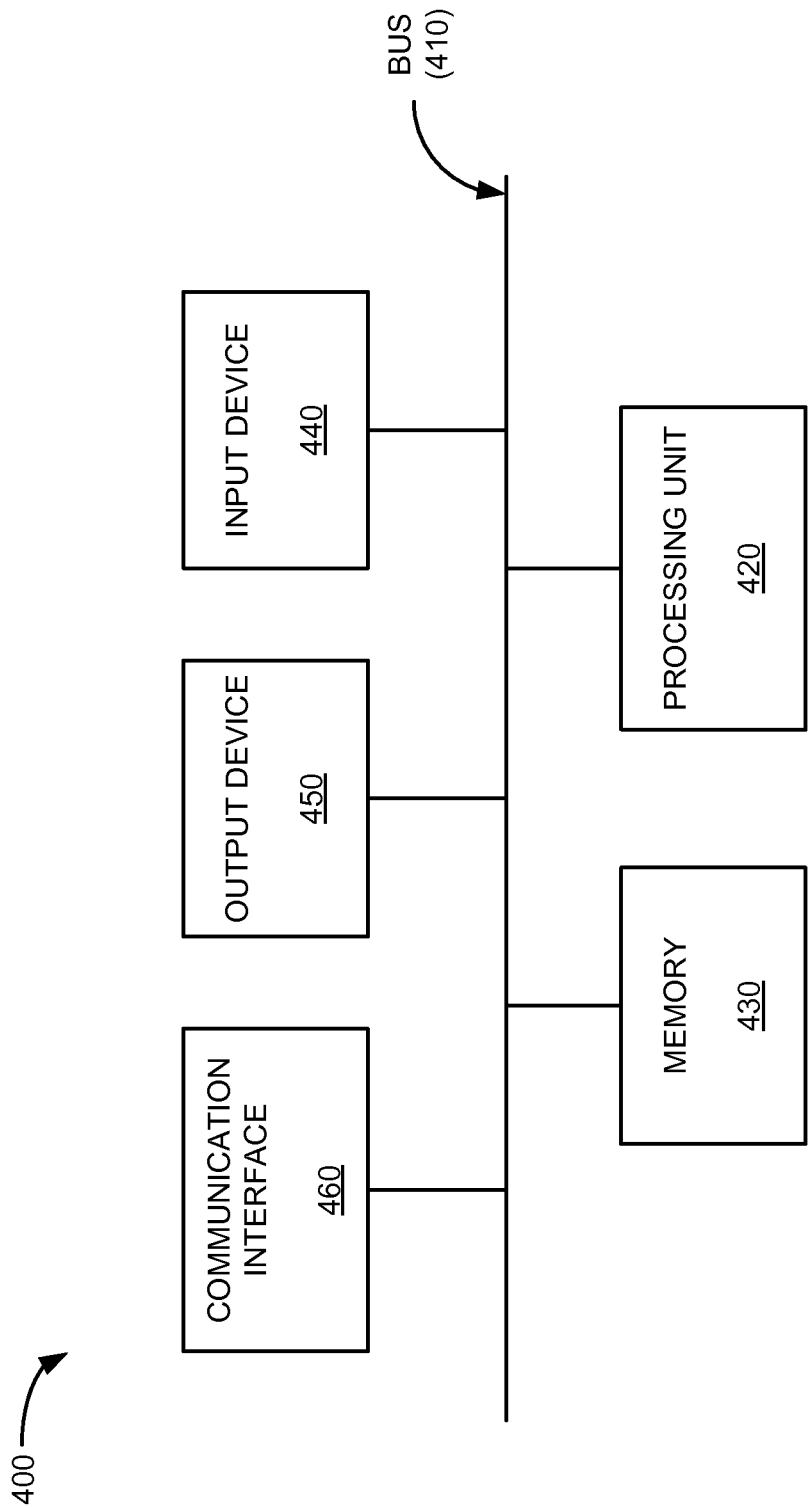
FIG. 4 is a diagram of exemplary components of a device that may be used within the network of FIGS. 1-3.

FIG. 4 is a diagram of exemplary components of a device 400. Device 400 may correspond to transaction device 120, payment processor 130, dial access server 215, gateway 220, load balancer 235, user device 240, customer portal 245, entitlement server 250, alarm server 255, usage management server 260, notification server 265, transaction services data system 300, transaction services management system 310, transaction services reporting system 320, transaction services tools system 330, or transaction services database 340. Each of transaction device 120, payment processor 130, dial access server 215, gateway 220, load balancer 235, user device 240, customer portal 245, entitlement server 250, alarm server 255, usage management server 260, notification server 265, transaction services data system 300, transaction services management system 310, transaction services reporting system 320, transaction services tools system 330, and transaction services database 340 may include one or more devices 400. As shown in FIG. 4, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for execution by processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, or the like. Output device 450 may include a device that outputs information to the operator, such as a display, a speaker, etc.

Communication interface 460 may include a transceiver (e.g., a transmitter and/or receiver) that enables device 400 to communicate with other devices and/or systems. For example, communication interface 460 may include mechanisms for communicating with other devices, such as other devices of network 100 or another device 400.

As described herein, device 400 may perform certain operations in response to processing unit 420 executing software instructions contained in a computer-readable medium, such as memory 430. A computer-readable medium may include a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than depicted in FIG. 4. As an example, in some implementations, input device 440 and/or output device 450 may not be implemented by device 400. In these situations, device 400 may be a "headless" device that does not explicitly include an input or an output device. Alternatively, or additionally, one or more components of device 400 may perform one or more other tasks described as being performed by one or more other components of device 400.

Figure 5:
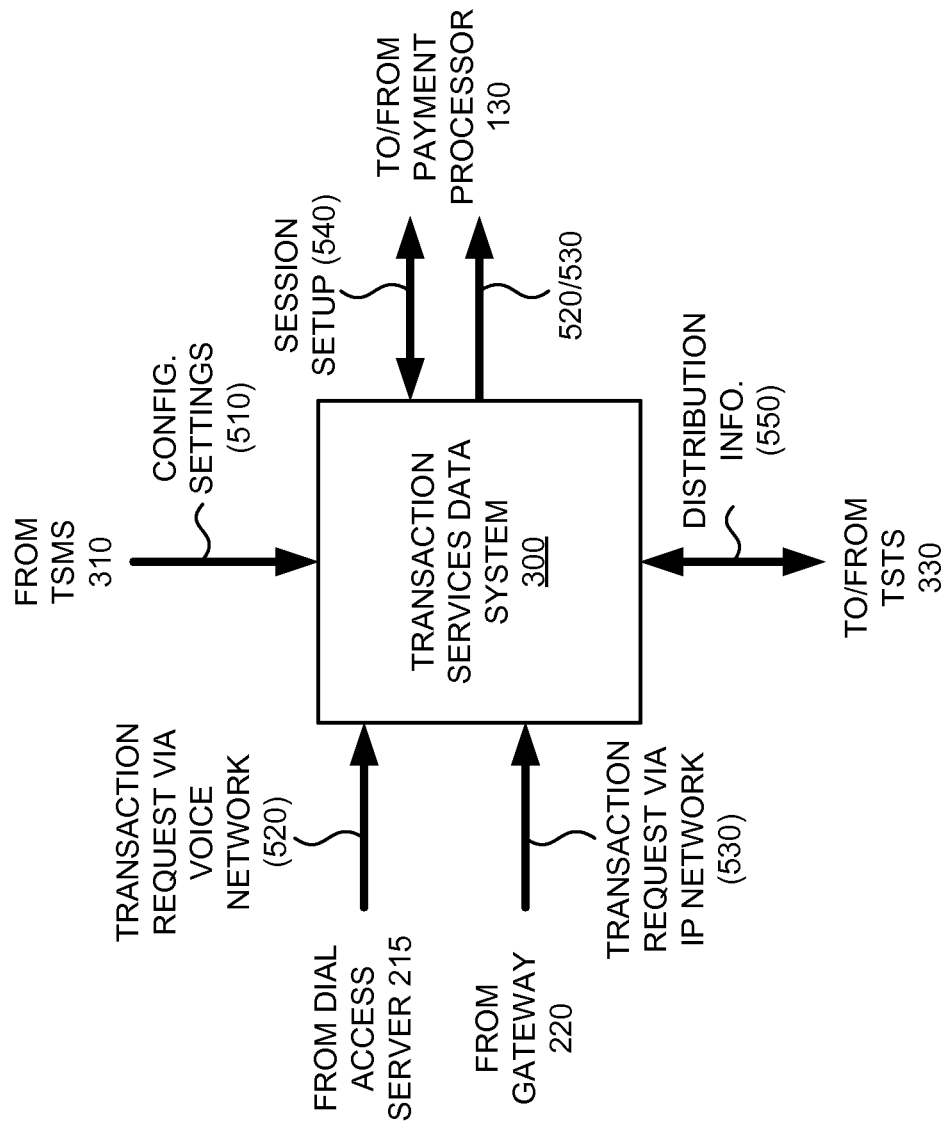
FIG. 5 is a diagram of exemplary communications for a transaction services data system of FIG. 3.

FIG. 5 is a diagram of exemplary communications for transaction services data system 300. As shown in FIG. 5, transaction services data system 300 may receive configuration settings 510 from transaction services data system (TSMS) 310. Configuration settings 510 may include configuration and/or provisioning information provided by account managers based on, for example, contracts and service level agreements of particular customers. In one implementation, transaction services data system 300 may be implemented as a fully redundant system with multiple devices. For example, transaction services data system 300 may include four geographically diverse devices so that configuration settings 510 and subsequent customer traffic can be received by any of the four devices of transaction services data system 300.

Based on configuration settings 510, transaction services data system 300 may exchange session setup information 540 with payment processor 130 to establish a secure TCP/IP session. In one implementation, setup information 540 may include ongoing communications (e.g., pings) to maintain a persistent socket with payment processor 130 and to monitor host connectivity. Ongoing communications may prevent sessions from being closed down and/or may provide for real-time monitoring. For example, transaction services data system 300 may provide an alarm signal to transaction services tools system 330 if ongoing communications are not maintained for a particular interval. In other implementations, a non-persistent socket connection and/or proprietary host protocols may be used. After receiving configuration settings 510, transaction services data system 300 may receive a voice network transaction request 520 from dial access server 215 and/or an IP network transaction request 530 from gateway 220 (e.g., via PIP network 225 (not shown).

As indicated by reference number 550, transaction services data system 300 may retrieve distribution information (e.g., customer information) necessary to forward voice network transaction request 520 and/or an IP network transaction request 530 to the appropriate customer. Transaction services data system 300 may also log information (e.g., origination source, time, etc.) about voice network transaction request 520 and/or an IP network transaction request 530 and send the logged information to transaction services tools system 330. Files included in distribution information 550 may include, for example, usage detail records; session detail records; application status records; alarm detail files; and/or log files, crash dumps, or core files from transaction services data system 300 applications.

Transaction services data system 300 may forward transaction requests 520/530 to the appropriate payment processor 130 associated with the request (e.g., using the session established via session setup information 540). In cases where there are multiple customer hosts (e.g., multiple devices at payment processor 130), transaction services data system 300 may perform load balancing among the multiple customer hosts.

Figure 6:
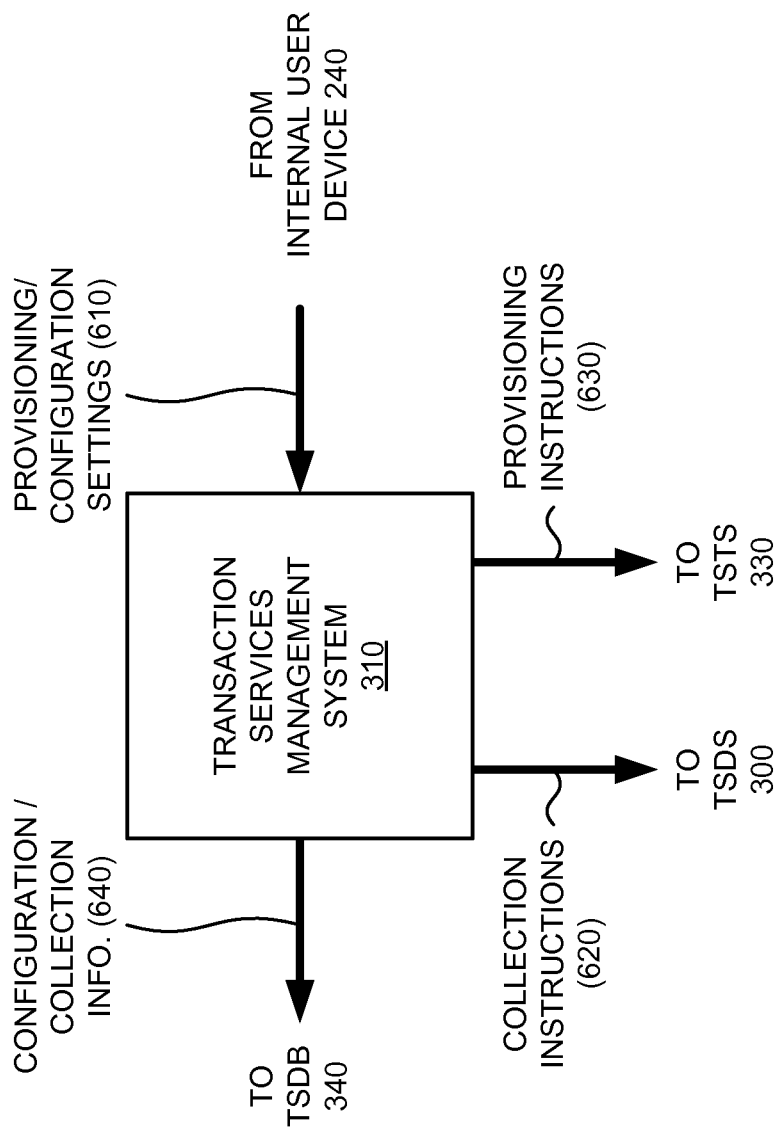
FIG. 6 is a diagram of exemplary communications for a transaction services management system of FIG. 3.

FIG. 6 is a diagram of exemplary communications for transaction services management system 310. As shown in FIG. 6, transaction services management system 310 may receive provisioning and configuration information (e.g., for particular customers) from internal user device 240. User device 240 may provide a web-based interface to receive user input, such as input from an account manager associated with network provider 160. For example, user device 240 may receive, from a user, SLA requirements and other provisioning requirements to support customer contracts. In one implementation, a user may confirm that transaction services hub 230 can support requested provisioning levels (e.g., for new transaction services customers) using other network information and/or reporting systems. Provisioning requirement may include, for example, bandwidth allocations, VPN connections, customer and client access information, etc. User device 240 may receive provisioning/configuration information and provide the provisioning/configuration settings to transaction services management system 310, as indicated by reference number 610 (which may correspond to configuration settings 510).

Transaction services management system 310 may receive provisioning/configuration settings 610 and may sort and distribute information to other components of transaction services hub 230. For example, based on provisioning/configuration settings 610, transaction services management system 310 may provide instructions to transaction services data system 300 and/or transaction services tools system 330. In one implementation, transaction services management system 310 may provide collection instructions 620 to transaction services data system 300 based on provisioning/configuration settings 610. Collection instructions 620 may identify, for example, types of information to collect during transactions, collection intervals, etc. Transaction services management system 310 may also provide provisioning instructions 630 to transaction services data system 300 based on provisioning/configuration settings 610. Provisioning instructions 630 may include, for example, routing information, bandwidth reservations, port information, etc. required to support data transfers to/from a particular customer (e.g., payment processor 130).

Additionally, or alternatively, transaction services management system 310 may communication indirectly with transaction services data system 300 and/or transaction services tools system 330. For example, based on provisioning/configuration settings 610, transaction services management system 310 may provide configuration/collection information 640 to transaction services database 340, from which transaction services tools system 330 may retrieve and implement configuration/collection information 640.

Figure 7:
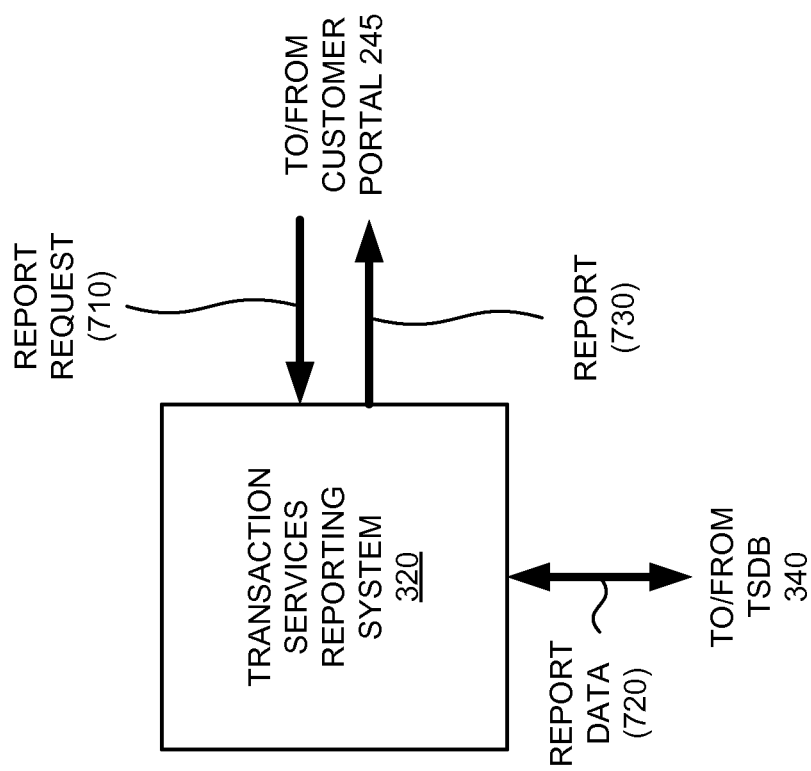
FIG. 7 is a diagram of exemplary communications for a transaction services reporting system of FIG. 3.

FIG. 7 is a diagram of exemplary communications for transaction services reporting system 320. As shown in FIG. 7, transaction services reporting system 320 may receive reporting configurations and preferences (e.g., for particular customers) from a customer portal 245. Customer portal 245 may provide a web-based interface to receive user input, such as input from a customer associated with payment processor 130. For example, customer portal 245 may receive, from a user, selections of particular default report formats and/or customized report formats for transaction services data. In one implementation, a user may schedule reports that transaction services hub 230 may generate at the scheduled times. Customer portal 245 may receive report settings from the user and may provide the report request to transaction services reporting system 320, as indicated by reference number 710. Report request 710 may include, for example, a selection from a menu of available report types provided via customer portal 245.

As shown in FIG. 7, transaction services reporting system 320 may receive report request 710. In response to report request 710, transaction services reporting system 320 may retrieve report data 720 from transaction services database 340. Transaction services reporting system 320 may apply report data 720 to one or more graphical templates to generate reports for customers (e.g., responsive to report request 710). For example, based on report request 710, transaction services reporting system 320 may automatically generate default reports when a user accesses a particular web page from customer portal 245. Requested report data may identify, for example, instances of applications used by clients of the customer over particular time periods, indicate sales volumes for particular types of transaction access (e.g., voice network, public IP network, etc.), list a number of concurrent sessions, etc. In other implementations, requested report data may include particular fields/information indicated or identified by report request 710.

Figure 8:
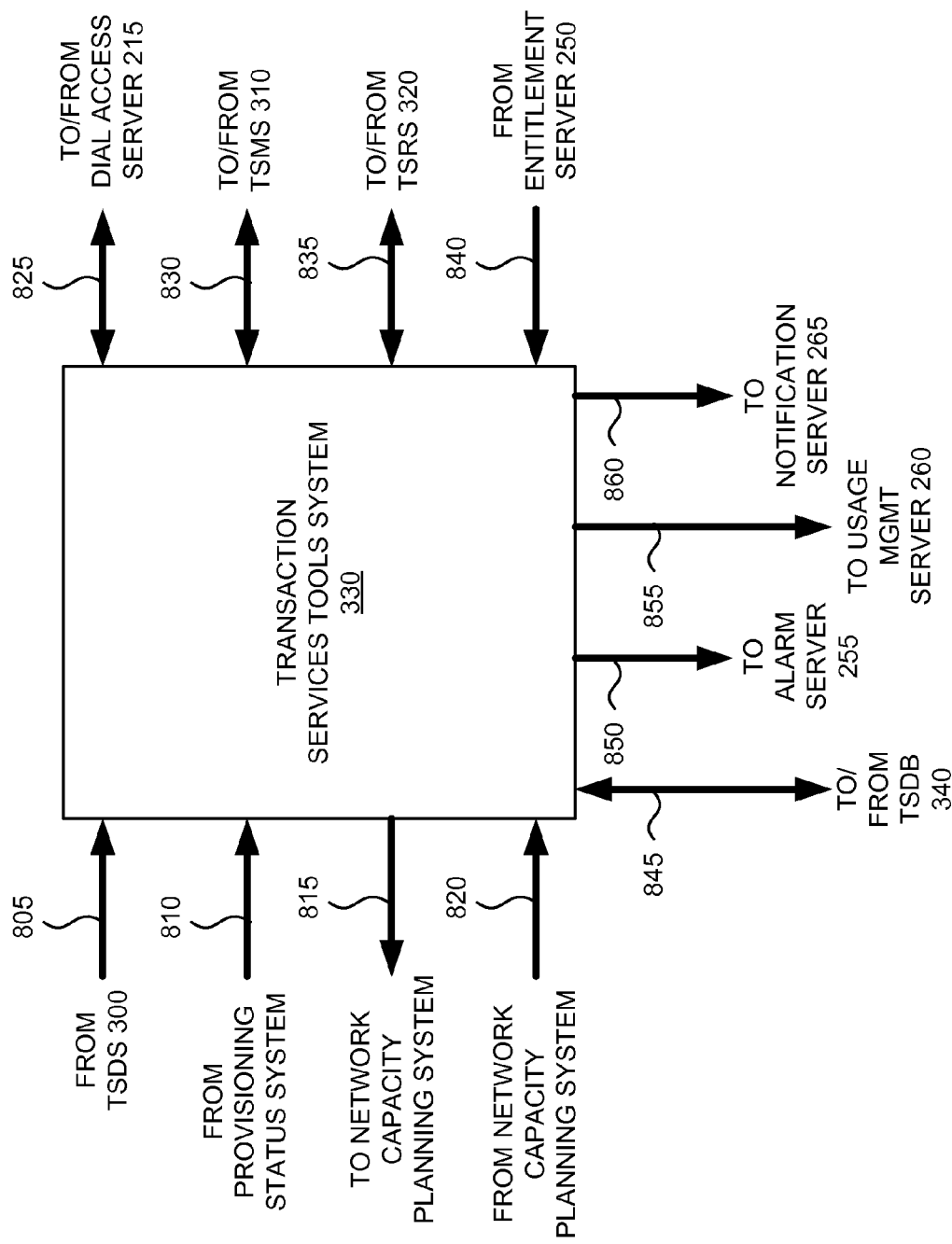
FIG. 8 is a diagram of exemplary communications for a transaction services tools system of FIG. 3.

FIG. 8 is a diagram of exemplary communications for transaction services tools system 330. As shown in FIG. 8, transaction services tools system 330 may receive transaction files 805 from transaction services data system 300. Transaction files 805 may correspond to, for example, distribution information 550 that includes usage detail records; session detail records; application status records; alarm detail files; and/or log files, crash dumps, or core files from transaction services data system 300 applications.

Transaction services tools system 330 may receive provisioning information 810 from a provisioning status system. Provisioning information 810 may include, for example, files that inform transaction services hub 230 when various customer orders are completed (e.g., provisioned to begin receiving transaction requests from transaction devices 120). Transaction services tools system 330 may provide customer identifiers 815 to a network capacity planning system. The network capacity planning system may also send files 820 to transaction services tools system 330. Files 820 may include information about specific toll free numbers and routing plans (e.g., associated with a particular payment processor 130).

Transaction services tools system 330 may maintains active TCP connections with dial access server(s) 215 and may receive session data files 825 from dial access server(s) 215. The session data files may include, for example, session detail records and/or accounting records.

Transaction services tools system 330 may receive instructions 830 from transaction services management system 310. Instructions 830 may correspond to, for example, provisioning instructions 630 that include routing information, bandwidth reservations, port information, etc. required to support data transfers to/from a particular customer (e.g., payment processor 130).

Transaction services tools system 330 may receive requests 835 from transaction services reporting system 320. Requests 835 may correspond to, for example, report request 710 that includes a selection from a menu of available report types provided via customer portal 245. In one implementation, requests 835 may also include configuration changes, ad hoc reporting configurations, and/or point-of-contact changes for a particular customer.

Transaction services tools system 330 may receive entitlement feed 840 from entitlement server 250. Entitlement feed 840 may contain a list of external/customer users that are allowed to access transaction services hub (e.g., transaction services reporting system 320). Transaction services tools system 330 may use entitlement feed 840 to map users to their appropriate customer accounts.

Transaction services tools system 330 may validate, unpack, and load files into appropriate tables of transaction services database 340, as indicated by reference 845. For example, files 805, provisioning information 810, files 820, session data files 825, instructions 830, and/or entitlement feed 840 may be sent to transaction services database 340 for storage. In one implementation, transaction services tools system 330 may also periodically place data and/or log files into compressed archives, as well as completely removing obsolete files.

Additionally, or alternatively, transaction services tools system 330 may periodically read information from transaction services database 340 to identify updates (e.g., configuration updates, reporting updates, etc. from other components of transaction services hub 230). Transaction services tools system 330 may implement the updates and/or report the updates to other transaction services hub 230 components (e.g., transaction services data system 300, transaction services management system 310, and/or transaction services reporting system 320). Thus, transaction services tools system 330 may provide an intermediate communication interface to promote network/data security.

Transaction services tools system 330 may send alarm information 850 to alarm server 255. Transaction services tools system 330 may monitor alarm tables, and based on configuration, may send emails to make sure that the appropriate support teams are notified in near real time for critical issues.

Transaction services tools system 330 may aggregate data from transaction files 805, session data files 825, and/or other data and provide the aggregated data to usage management server 260 as usage data 855. Usage data 855 may include, for example, customer-specific session billing data, billing audit information, and the like.

Transaction services tools system 330 may provide contact data 860 to notification server 265. In one implementation, contact data 860 may be extracted from, for example, instructions 830 and/or requests 835. Contact data 860 may include, for example, a customer point-of-contact list for reporting scheduled maintenance and/or unscheduled outages.

Figure 9:
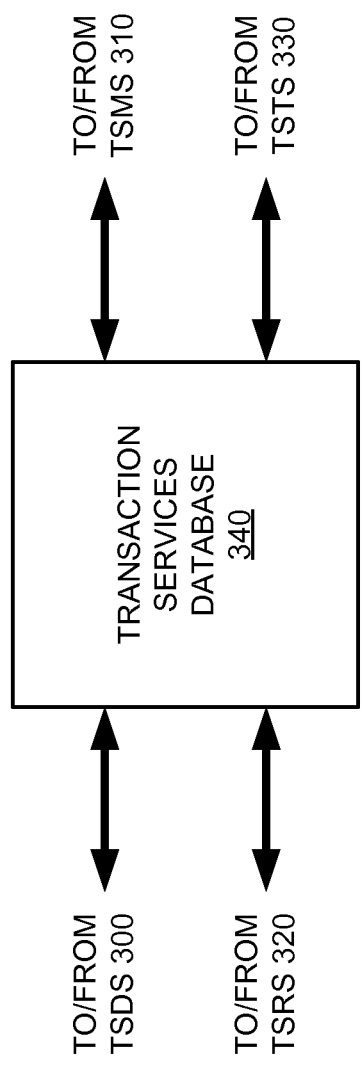
FIG. 9 is a diagram of exemplary communications for a transaction services database of FIG. 3.

FIG. 9 is a diagram of exemplary communications for transaction services database 340. As shown in FIG. 9, transaction services database 340 may receive and store data from any of transaction services data system 300, transaction services management system 310, transaction services reporting system 320, or transaction services tools system 330. In other implementations, transaction services tools system 330 may receive data from other transaction services hub 230 components (e.g., transaction services data system 300, transaction services management system 310, and/or transaction services reporting system 320) and format the received data before loading the data in transaction services database 340 for storage. In one implementation, stored information in transaction services database 340 may be retrieved directly by one of transaction services data system 300, transaction services management system 310, transaction services reporting system 320, or transaction services tools system 330. In another implementation, transaction services tools system 330 may process data retrieval requests from the other transaction services hub 230 components. As noted above, in one implementation, transaction services database 340 may include stored procedures rather than direct access to data tables. Thus, components of transaction services hub 230 may access transaction services database 340 using calls to stored procedures.

Figure 10:
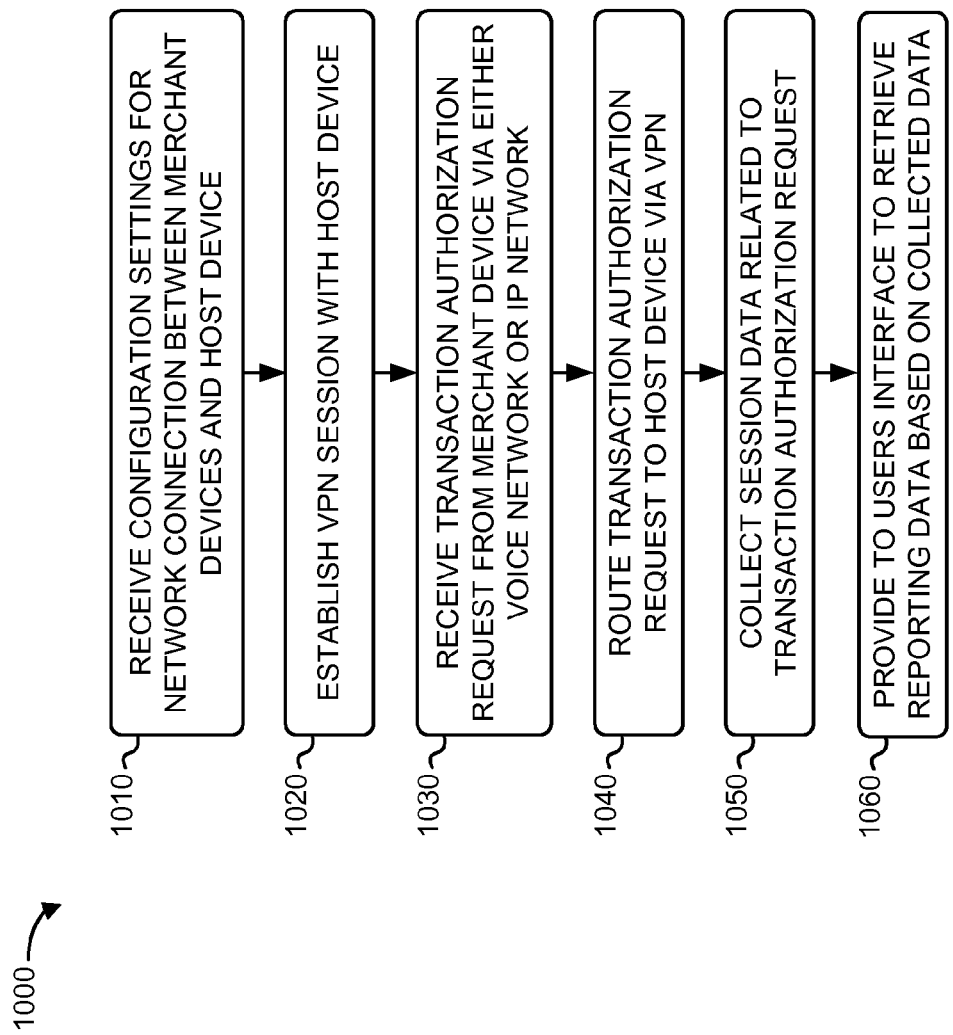
FIG. 10 is a flowchart of an exemplary process for providing transaction services, according to an implementation described herein.

FIG. 10 is a flowchart of an exemplary process 1000 for providing transaction services, according to an implementation described herein. In one implementation, process 1000 may be performed by one or more components of transaction services hub 230, such as one or more processing units 420. In another implementation, one or more blocks of process 1000 may be performed by one or more other devices or a group of devices including or excluding transaction services hub 230.

Process 1000 may include receiving configuration settings for network connections between merchant devices and a host device (block 1010) and establishing a VPN session with the host device (block 1020). For example, as described in connection with FIGS. 5 and 6, transaction services management system 310 may receive provisioning and configuration information (e.g., for particular customers) from internal user device 240. Provisioning requirement may include, for example, bandwidth allocations, VPN connections, customer and client access information, etc. Transaction services management system 310 may receive provisioning/configuration settings 610 and may sort and distribute information to other components of transaction services hub 230. Transaction services data system 300 may exchange session setup information 540 with payment processor 130 to establish a secure TCP/IP session. In one implementation, setup information 540 may include ongoing communications (e.g., pings) to maintain a persistent socket with payment processor 130. In other implementations, a non-persistent socket connection and/or proprietary host protocols may be used.

Process 1000 may also include receiving transaction authorization request from the merchant device via either a voice network or an IP network (block 1030) and routing the transaction authorization request to the host device via the VPN (block 1040). For example, as described above in connection with FIG. 5, after receiving configuration settings 510, transaction services data system 300 may receive a voice network transaction request 520 from dial access server 215 and/or an IP network transaction request 530 from gateway 220 (e.g., via PIP network 225). Transaction services data system 300 may retrieve distribution information (e.g., customer information) necessary to forward voice network transaction request 520 and/or an IP network transaction request 530 to the appropriate customer. Transaction services data system 300 may forward transaction requests 520/530 to the appropriate payment processor 130 associated with the request (e.g., using the session established via session setup information 540). In cases where there are multiple customer hosts (e.g., multiple devices at payment processor 130), transaction services data system 300 may perform load balancing among the multiple customer hosts.

Process 1000 may include collecting session data related to transaction authorization request (block 1050). For example, as described above in connection with FIG. 5, transaction services data system 300 may log information (e.g., origination source, time, etc.) about voice network transaction request 520 and/or an IP network transaction request 530 and send the logged information to transaction services tools system 330. Logged information may include usage detail records; session detail records; application status records; alarm detail files; and/or log files, crash dumps, or core files from transaction services data system 300 applications.

Process 1000 may further include providing to users an interface to retrieve reporting data based on the collected data (block 1060). For example, as described above in connection with FIG. 7, transaction services reporting system 320 may receive reporting configurations and preferences (e.g., for particular customers) from a customer portal 245. Customer portal 245 may provide a web-based interface to receive user input, such as input from a customer associated with payment processor 130. Transaction services reporting system 320 may receive report request 710. In response to report request 710, transaction services reporting system 320 may retrieve report data 720 from transaction services database 340. Transaction services reporting system 320 may apply report data 720 to one or more graphical templates to generate reports for customers (e.g., responsive to report request 710). For example, based on report request 710, transaction services reporting system 320 may automatically generate default reports when a user accesses a particular web page from customer portal 245.

Systems and/or methods described herein may provide a transaction services platform to facilitate inquiry-and-response type data communications characterized by short sessions, low-bandwidth requirements, quick call set-ups, and short billing times. The system provides redundancy to support incoming transaction requests from multiple (e.g., hundreds or thousands) merchants to a single payment processor (or payment processor group) over various types of network. A transaction services hub may be integrated with existing network services to provide configuration management tools, customer reports, notifications, billing information, and the like.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A system, comprising:
   a management network device to:
      receive, via an internal distribution network interface, configuration settings for data communication services, over a transaction services network, between merchant devices and a host device within a customer's private network, and
      allocate bandwidth, based on the configuration settings, to support the data communication services over the transaction services network between the merchant devices and the host device;
   a data network device including a transaction gateway application to:
      establish, via a multiprotocol label switching (MPLS) network within the transaction services network and based on the configuration settings, a virtual private network (VPN) session between one or more devices within a transaction services hub and the host device,
      receive, from a first merchant device, a first transaction authorization request directed to the host device, wherein the first transaction authorization request originates via a voice network including a public switched telephone network (PSTN),
      receive, from a second merchant device, a second transaction authorization request directed to the host device, wherein the second transaction authorization request originates via an Internet Protocol (IP) network,
      route, by the one or more devices within the transaction services hub, to the host device and via the VPN session, the first and the second transaction authorization requests, and
      collect session data associated with each of the first and the second transaction authorization requests;
   a tools network device including at least one collector application to:
      perform real-time monitoring of the VPN session,
      generate an alarm signal when the real-time monitoring indicates communications are not maintained for a particular interval, and
      store, in a database within the transaction services hub, the session data and the alarm signal associated with the host device; and
   a reporting network device to provide, to a user device associated with the host device, via a public network connection, an interface to retrieve reports including the stored data in the database.

2. The system of claim 1, wherein the voice network is one of a domestic toll-free voice network or an international toll-free voice network.

3. The system of claim 2, wherein the second transaction authorization request is received from the second merchant device via one of SSL encryption protocols or another VPN session.

4. The system of claim 1, wherein the data network device further collects:

usage detail records,
application status records, and
alarm detail records.

5. The system of claim 1, wherein the management network device and the reporting network device access the stored data using calls to stored procedures.

6. The system of claim 1, further comprising:
   a processing component to perform load balancing of traffic across multiple host devices.

7. The system of claim 1, wherein the VPN session includes a persistent socket connection.

8. The system of claim 1, wherein the tools network device includes:
   an interface to an alarm notification system for a private IP network,
   an interface to a usage monitoring system for the private IP network, and
   an interface to an email notification system for the private IP network.

9. The system of claim 1, wherein the data network device is configured to establish VPN sessions with multiple host devices of multiple hosts, and wherein the data network device includes a separate instance of the transaction gateway application for each of the multiple hosts.

10. The system of claim 1, further comprising:
    at least one other data network device including a transaction gateway application; and
    a load balancing device to balance traffic across the data network device and the at least one other data network device.

11. A method performed by one or more devices within a transaction services hub of a transaction services network, the method comprising:
    receiving, via an internal distribution network interface, configuration settings for data communication services over the transaction services network between merchant devices and a host device within a customer's private network;
    allocating bandwidth, based on the configuration settings, to support the data communication services over the transaction services network between the merchant devices and the host device;
    establishing, via a multiprotocol label switching (MPLS) network within the transaction services network and based on the configuration settings, a virtual private network (VPN) session between an instance of a transaction gateway application on the one or more devices within the transaction services hub and the host device, wherein the instance of the transaction gateway application is dedicated to the host device;
    receiving, by the one or more devices within the transaction services hub and from a first merchant device, a first transaction authorization request directed to the host device, wherein the first transaction authorization request originates via a voice network including a public switched telephone network (PSTN);
    receiving, by the one or more devices within the transaction services hub and from a second merchant transaction device, a second transaction authorization request directed to the host device, wherein the second transaction authorization request originates via an Internet Protocol (IP) network;
    routing, by the one or more devices within the transaction services hub and via the VPN session, the first and the second transaction authorization requests to the host device;

collecting, by the one or more devices within the transaction services hub, session data associated with each of the first and the second transaction authorization requests;
performing, by the one or more devices within the transaction services hub, real-time monitoring of the VPN session;
generating, by the one or more devices within the transaction services hub, an alarm signal when the real-time monitoring indicates communications are not maintained for a particular interval;
storing, in a database within the transaction services hub, the session data and the alarm signal associated with the host device; and
providing, to a user device and via a public network connection, an interface to retrieve reports including the stored session data in the database.

12. The method of claim 11, wherein the first transaction authorization request originates via one of a domestic toll-free voice network or an international toll-free voice network, and wherein the second transaction authorization request originates via a secure socket layer (SSL) connection.

13. The method of claim 11, further comprising:
formatting, for storage in the database, the collected data; and
periodically storing the collected data into compressed archives.

14. The method of claim 13, wherein the interface to retrieve reports provides access to one or more calls to stored procedures within the database.

15. The method of claim 11, wherein the VPN session is one of multiple sessions in a persistent socket connection.

16. The method of claim 11, wherein, when routing the first and the second transaction authorization requests to the host device, the one or more devices within the transaction services hub perform load balancing across multiple host devices associated with a particular customer.

17. A non-transitory computer-readable medium, comprising computer-executable instructions, for causing one or more processors executing the computer-executable instructions to:
receive, via an internal distribution network interface, configuration settings for data communication services over a transaction services network between merchant devices and a host device within a customer's private network;
allocate bandwidth, based on the configuration settings, to support the data communication services over the transaction services network between the merchant devices and the host device;
establish, via a multiprotocol label switching (MPLS) network within the transaction services network and based on the configuration settings, a virtual private network (VPN) session between an instance of a transaction gateway application on the one or more devices within the transaction services hub and the host device, wherein the instance of the transaction gateway application is dedicated to the host device;
receive, from a first merchant device, a first transaction authorization request directed to the host device, wherein the first transaction authorization request originates via a voice network including a public switched telephone network (PSTN);
receive, from a second merchant transaction device, a second transaction authorization request directed to the host device, wherein the second transaction authorization request originates via an Internet Protocol (IP) network;
route, to the host device and via the VPN session, the first and the second transaction authorization requests;
collect session data associated with each of the first and the second transaction authorization requests;
perform real-time monitoring of the VPN session;
generate an alarm signal when the real-time monitoring indicates communications are not maintained for a particular interval;
store, in a database within the transaction services hub, the session data and the alarm signal associated with the host device; and
provide, to a user device and via a public network connection, an interface to retrieve reports including the stored data in the database.

18. The computer readable medium of claim 17, further comprising computer-executable instructions, for causing one or more processors executing the computer-executable instructions to:
format, for storage in the database, the session data; and
periodically store the formatted session data into compressed archives within the database.

* * * * *